(12) United States Patent
Huang et al.

(10) Patent No.: US 11,544,857 B1
(45) Date of Patent: Jan. 3, 2023

(54) METHOD AND DEVICE FOR CALCULATING RIVER SURFACE FLOW VELOCITY BASED ON VARIATIONAL PRINCIPLE

(71) Applicant: WUHAN UNIVERSITY, Hubei (CN)

(72) Inventors: Kailin Huang, Hubei (CN); Hua Chen, Hubei (CN); Bingyi Liu, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 17/703,906

(22) Filed: Mar. 24, 2022

(30) Foreign Application Priority Data

Oct. 26, 2021 (CN) .......................... 202111245260.1

(51) Int. Cl.
*G06T 7/62* (2017.01)
*G06T 7/246* (2017.01)
*G06T 7/269* (2017.01)
*G06T 7/80* (2017.01)
*G06T 7/262* (2017.01)

(52) U.S. Cl.
CPC .............. *G06T 7/262* (2017.01); *G06T 7/246* (2017.01); *G06T 7/269* (2017.01); *G06T 7/80* (2017.01); *G06T 2207/30181* (2013.01)

(58) Field of Classification Search
None
See application file for complete search history.

(56) References Cited

U.S. PATENT DOCUMENTS

2013/0035913 A1   2/2013   Mishev et al.
2016/0225162 A1   8/2016   Cody et al.

FOREIGN PATENT DOCUMENTS

| CN | 102542578 |   | 7/2012 |
| CN | 104699892 |   | 6/2015 |
| CN | 109584314 |   | 4/2019 |
| CN | 110836981 |   | 2/2020 |
| CN | 113012195 A | * | 6/2021 |
| WO | WO-2019215584 A1 | * | 11/2019 |

OTHER PUBLICATIONS

CN-113012195-A Translation (Year: 2021).*

* cited by examiner

*Primary Examiner* — Soo Shin
(74) *Attorney, Agent, or Firm* — JCIP Global Inc.

(57) ABSTRACT

A method and device for calculating a river surface flow velocity are provided based on a variational principle, which are used to capture and process the images of an objective area, and to obtain the flow velocity field data of the objective area with high precision in a non-contact manner. The method and device include 3 steps: (1) preparation before initial flow measurement; (2) capturing a video of the river by an image acquisition device, converting a motion of a pixel flow field of the fluid in a captured image sequence into solving an energy functional optimization problem, and solving partial differential equations to obtain data of pixel flow field distribution; and (3) obtaining space coordinates of the pixel point in a world coordinate system and calculating the flow velocity according to the data obtained in the step 2 and the transformation relationship determined in the step 1.

10 Claims, 2 Drawing Sheets

METHOD AND DEVICE FOR CALCULATING RIVER SURFACE FLOW VELOCITY BASED ON VARIATIONAL PRINCIPLE

CROSS-REFERENCE TO RELATED APPLICATION

This application claims the priority benefit of China application serial no. 202111245260.1 filed on Oct. 26, 2021. The entirety of the above-mentioned patent application is hereby incorporated by reference herein and made a part of this specification.

BACKGROUND

Technical Field

The disclosure belongs to the field of image data processing, and in particular relates to a method and device for calculating a river surface flow velocity based on a variational principle.

Description of Related Art

Hydrometry is an important element task of the country, river flow measurement is an important component of hydrometry. With the rapid expansion of social demands and the rapid improvement of informatization level, the river flow measurement needs to become automatic, intelligent and online. The key to the online river flow measurement lies in the online calculation of river section flow velocity. At present, it is difficult for the traditional contact measurement means to realize real-time online calculation of river section flow velocity, and the non-contact video-based flow measurement manner provides a solution for real-time online calculation of river section flow velocity.

At present, the contact flow measurement mainly adopts a rotating element current meter and an acoustic Doppler current profiler. The existing problems are: first, limited by the environment, it is required to equip the corresponding infrastructure for measurement, such as cableways; second, during the flood period, the flood may be quite dangerous for the surveyor; and third, the contact current measuring instruments are generally expensive and costly. The non-contact flow measurement mainly includes radar-based flow measurement and video imagery-based flow measurement. As for the radar-based flow measurement, limited by the strict installation position, the minimum distance and angle of the radar relative to the water surface required by different magnitudes of flow velocity are different. The video-based flow measurement mainly includes space-time image velocimetry (STIV), which calculates the water flow regime according to the brightness information of the image and can calculate the surface flow velocity in the absence of floating objects. However, STIV can only obtain the velocity in one dimension, and does not work well when the turbulence intensity is large.

SUMMARY

In order to solve the above problems, the present disclosure provides a method and device for calculating a river surface flow velocity based on a variational principle, which can acquire a target flow field with high precision in a non-contact manner.

In order to achieve the above objective, the present disclosure adopts the following solution:

The present disclosure provides a method for calculating a river surface flow velocity based on a variational principle, including the following steps:

step 1: preparation before initial flow measurement:

setting up a plurality of calibration boards on left bank and right bank slopes of a river according to characteristics of a site environment, and measuring and recording coordinates of the calibration boards using a measuring equipment;

setting up an image acquisition device, and adjusting a shooting angle and a focal length such that a field of view is capable of covering the calibration boards within a range and a motion of a fluid in the river;

determining a transformation relationship from three-dimensional coordinates of an image sequence to coordinates of a pixel point of an image based on positions of the calibration boards;

step 2: capturing a video of the river by the image acquisition device, and converting a motion of a pixel flow field of the fluid in a captured image sequence into solving the following energy functional extreme value problem;

$$E(\omega(i,j)) = \int \Phi\left(\frac{\partial I}{\partial t} + \nabla I^T \omega - D\Delta I\right) + \phi(\nabla \omega) d\omega \quad (1)$$

wherein i represents a set of pixels in an i-th row in the image, j represents a set of pixels in a j-th column in the image, t is a shooting time of the image, $\omega(i,j)$ represents a pixel flow field distribution to be solved, $I=I(i,j,t)$ represents the captured image sequence, and D is a diffusion coefficient; $\nabla$ is a gradient operator, $\Delta$ is a Laplacian operator, and $\alpha$ is a weight coefficient; $\Phi$, $\phi$ are functions respectively for a flow field and a gradient; a general form of an objective functional is:

$$E(\omega(i,j)) = \int \left(\frac{\partial I}{\partial t} + \nabla I^T \omega - D\Delta I\right)^2 + \alpha \nabla \omega^T \nabla \omega d\omega \quad (2)$$

the pixel flow field distribution $\omega(i,j)$ is solved; and step 3: obtaining space coordinates of the pixel point in a world coordinate system according to data of the pixel flow field distribution $\omega(i,j)$ calculated in the step 2 and the transformation relationship determined in the step 1, and further obtaining a flow velocity $$v = \frac{d}{\Delta t},$$

wherein d is a length of a flow velocity vector in $\omega$ projected to world coordinates, and $\Delta t$ is a time difference between frames of calculated images.

Preferably, the method for calculating the river surface flow velocity based on the variational principle provided by the present disclosure may further have the following characteristics: in the step 1, first, a flow measurement site is investigated such that a selected position has a sufficient field of view to observe 80% or more of an area of the river; and a power supply infrastructure required for video recording and video transmission is configured.

Preferably, the method for calculating the river surface flow velocity based on the variational principle provided by the present disclosure may further have the following characteristics: in the step 1, the coordinates of the pixel point in the image are marked as (i,j), the coordinates of a corresponding point in a three-dimensional space are marked as (x,y,z), and an n-th undetermined parameter of a camera calibration is marked as $l_n$; a calculation is carried out according to the following transformation formula:

$$i = \frac{l_1 x + l_2 y + l_3 z_w + l_4}{l_9 x + l_{10} y + l_{11} z_w + 1}, j = \frac{l_5 x + l_6 y + l_7 z_w + l_8}{l_9 x + l_{10} y + l_{11} z_w + 1} \quad (3)$$

mapping of pixel coordinates projected to the world coordinates is represented by $$Proj\left(\begin{bmatrix} i \\ j \end{bmatrix}\right) \rightarrow \begin{bmatrix} x \\ y \\ z \end{bmatrix},$$

mapping of the world coordinates projected to the pixel coordinates is represented by $$Proj^{-1}\left(\begin{bmatrix} x \\ y \\ z \end{bmatrix}\right) \rightarrow \begin{bmatrix} i \\ j \end{bmatrix},$$

and the above equation is solved based on the position coordinates corresponding to the calibration boards, which are preset, to obtain the transformation relationship from the three-dimensional coordinates of the image sequence to the coordinates of the pixel point of the image.

Preferably, the method for calculating the river surface flow velocity based on the variational principle provided by the present disclosure may further have the following characteristics: in the step 1, a number of the calibration boards is not less than 6.

Preferably, the method for calculating the river surface flow velocity based on the variational principle provided by the present disclosure may further have the following characteristics: in the step 1, the river is filmed by a camera, the video is transmitted to a PC terminal through bridging equipment for preliminary review, the video is checked for a number of frames and damaged frames, a satisfactory video sequence is transferred to a preprocessing stage, and an unsatisfactory video sequence is deleted.

Preferably, the method for calculating the river surface flow velocity based on the variational principle provided by the present disclosure may further have the following characteristics: in the step 2, taking a quadratic penalty term shown as $\Phi(\bullet)=\phi(\bullet)=(\bullet)^2$ as an example, a Euler-Lagrange equation corresponding to a flow velocity field is:

$$\nabla I\left(\frac{\partial I}{\partial t} + \nabla I^T \omega - D\Delta I\right) - \alpha \Delta \omega = 0 \quad (4)$$

for an image I, a coordinate in a horizontal direction is represented by u, and a coordinate in a vertical downward direction is represented by v, and for numerical discretization, discretization schemes of the gradient of I are:

$$\left(\frac{\partial I}{\partial u}\right)_{i,j} = \begin{cases} I_{i,j+1} - I_{i,j}, & j < w \\ 0, & j = w \end{cases} \quad (5)$$

-continued $$\left(\frac{\partial I}{\partial v}\right)_{i,j} = \begin{cases} I_{i+1,j} - I_{i,j}, & i < h \\ 0, & i = h \end{cases} \quad (6)$$

wherein w represents a width of the image, and h represents a height of the image;

A set of partial differential equations shown in formula (4) may be iteratively solved through a gradient descent flow shown in formula (7) until convergence, and a motion direction and velocity of the pixel point of the river are inverted:

$$\omega^{k+1} = \omega^k - \theta\left\{\nabla I^k\left(\frac{\partial I^k}{\partial t} + \nabla (I^k)^T \omega^k - D\Delta I^k\right) - \alpha \Delta \omega^k\right\} \quad (7)$$

where θ is a step parameter, and k represents a count of the current round of iteration. In addition, for finite difference, discretization may be carried out by methods such as central difference, backward difference, etc. In addition to the finite difference, the partial differential equation (1) may also be solved by methods such as finite volume, finite element, dual optimization, etc.

Further, the present disclosure further provides a device for calculating a river surface flow velocity based on a variational principle, including:

a transformation relationship acquisition part, which is configured to acquire and record coordinates of calibration boards by an image acquisition device whose field of view is capable of covering the calibration boards within a range and a motion of a fluid in a river, and then determine a transformation relationship from three-dimensional coordinates of an image sequence to coordinates of a pixel point of an image based on positions of the calibration boards;

a solving part, configured to capture a video of the river by the image acquisition device, and convert a motion of a pixel flow field of the fluid in the captured image sequence into solving the following energy functional extreme value problem;

$$E(\omega(i, j)) = \int \Phi\left(\frac{\partial I}{\partial t} + \nabla I^T \omega - D\Delta I\right) + \phi(\nabla \omega) d\omega \quad (1)$$

wherein i represents a set of pixels in an i-th row in the image, j represents a set of pixels in a j-th column in the image, t is a shooting time of the image, ω(i,j) represents a pixel flow field distribution to be solved, I=I(i,j,t) represents the captured image sequence, and D is a diffusion coefficient, ∇ is a gradient operator, Δ is a Laplacian operator, and α is a weight coefficient; ϕ and φ are functions respectively for a flow field and a gradient; a general form of the objective functional is:

$$E(\omega(i, j)) = \int \left(\frac{\partial I}{\partial t} + \nabla I^T \omega - D\Delta I\right)^2 + \alpha \nabla \omega^T \nabla \omega d\omega \quad (2)$$

the pixel flow field distribution ω(i,j) is acquired, after optimizing the objective functional;

a flow velocity calculation part, which is configured to obtain space coordinates of the pixel point in a world coordinate system according to the solving result of the solving part and the transformation relationship determined by the transformation relationship acquisition part, and further obtain the flow velocity $$v = \frac{d}{\Delta t},$$

wherein d is a length of a flow velocity vector in ω projected to world coordinates, and Δt is a time difference between frames of the calculated images; and a control part, which communicates with the transformation relationship acquisition part, the solving part and the flow velocity calculation part and configured to control operations thereof.

Preferably, the device for calculating the river surface flow velocity based on the variational principle provided by the present disclosure may further include the following feature: an input and display part, which communicates with the transformation relationship acquisition part, the solving part, the flow velocity calculation part, and the control part, and the input and display part is configured to allow a user to input an operation instruction and display a corresponding result.

Preferably, the device for calculating the river surface flow velocity based on the variational principle provided by the present disclosure may further include the following feature: in the transformation relationship acquisition part, the coordinates of the pixel point in the image are marked as (i,j), the coordinates of a corresponding point in a three-dimensional space are marked as (x,y,z), and an n-th undetermined parameter of a camera calibration is marked as $l_n$; a calculation is carried out according to the following transformation formula:

$$i = \frac{l_1 x + l_2 y + l_3 z_w + l_4}{l_9 x + l_{10} y + l_{11} z_w + 1}, \; j = \frac{l_5 x + l_6 y + l_7 z_w + l_8}{l_9 x + l_{10} y + l_{11} z_w + 1} \quad (3)$$

mapping of pixel coordinates projected to the world coordinates is represented by $$Proj\left(\begin{bmatrix} i \\ j \end{bmatrix}\right) \to \begin{bmatrix} x \\ y \\ z \end{bmatrix},$$

mapping of the world coordinates projected to the pixel coordinates is represented by $$Proj^{-1}\left(\begin{bmatrix} x \\ y \\ z \end{bmatrix}\right) \to \begin{bmatrix} i \\ j \end{bmatrix},$$

and the above equation is solved based on the position coordinates corresponding to the calibration boards, which are preset, to obtain the transformation relationship from the three-dimensional coordinates of the image sequence to the coordinates of the pixel point of the image.

Preferably, the device for calculating the river surface flow velocity based on the variational principle provided by the present disclosure may further include the following feature: in the solving part, a Euler-Lagrange equation corresponding to a flow velocity field is:

$$\nabla I \left( \frac{\partial I}{\partial t} + \nabla I^T \omega - D \Delta I \right) - \alpha \Delta \omega = 0 \quad (4)$$

for an image I, a coordinate in a horizontal direction is represented by u, and a coordinate in a vertical downward direction is represented by v, and for numerical discretization, discretization schemes of the gradient of I are:

$$\left(\frac{\partial I}{\partial u}\right)_{i,j} = \begin{cases} I_{i,j+1} - I_{i,j}, & j < w \\ 0, & j = w \end{cases} \quad (5)$$

$$\left(\frac{\partial I}{\partial v}\right)_{i,j} = \begin{cases} I_{i+1,j} - I_{i,j}, & i < h \\ 0, & i = h \end{cases} \quad (6)$$

wherein w represents a width of the image, and h represents a height of the image.

A set of partial differential equations shown in formula (4) may be iteratively solved through a gradient descent flow shown in formula (7) until convergence, and a motion direction and velocity of the pixel point of the river are inverted:

$$\omega^{k+1} = \omega^k - \theta \left\{ \nabla I^k \left( \frac{\partial I^k}{\partial t} + \nabla (I^k)^T \omega^k - D \Delta I^k \right) - a \Delta \omega^k \right\} \quad (7)$$

where θ is a step parameter, and k represents a count of the current round of iteration. In addition, for finite difference, discretization may be carried out by methods such as central difference, backward difference, etc. In addition to the finite difference, the equation may also be solved by methods such as finite volume, finite element, dual optimization, etc.

According to the method and device for calculating the river surface flow velocity based on the variational principle provided by the present disclosure, starting from the equations of motion of the fluid and considering the prior information of fluid motion, the corresponding energy functional is constructed based on the smoothness assumption, and on such a basis, a fluid surface flow velocity method based on a multi-scale and deformation theory is constructed. After establishing the pixel-space relationship through the preset auxiliary calibration facilities, the information of the fluid surface flow field can be obtained quickly and accurately. The present disclosure can provide new ideas and approaches for modern hydrological monitoring and refined management of water resources.

DESCRIPTION OF THE EMBODIMENTS

Specific implementations of the method and device for calculating the river surface flow velocity based on the variational principle according to the present disclosure will be described below in detail in conjunction with the accompanying drawings.

Figure 1:
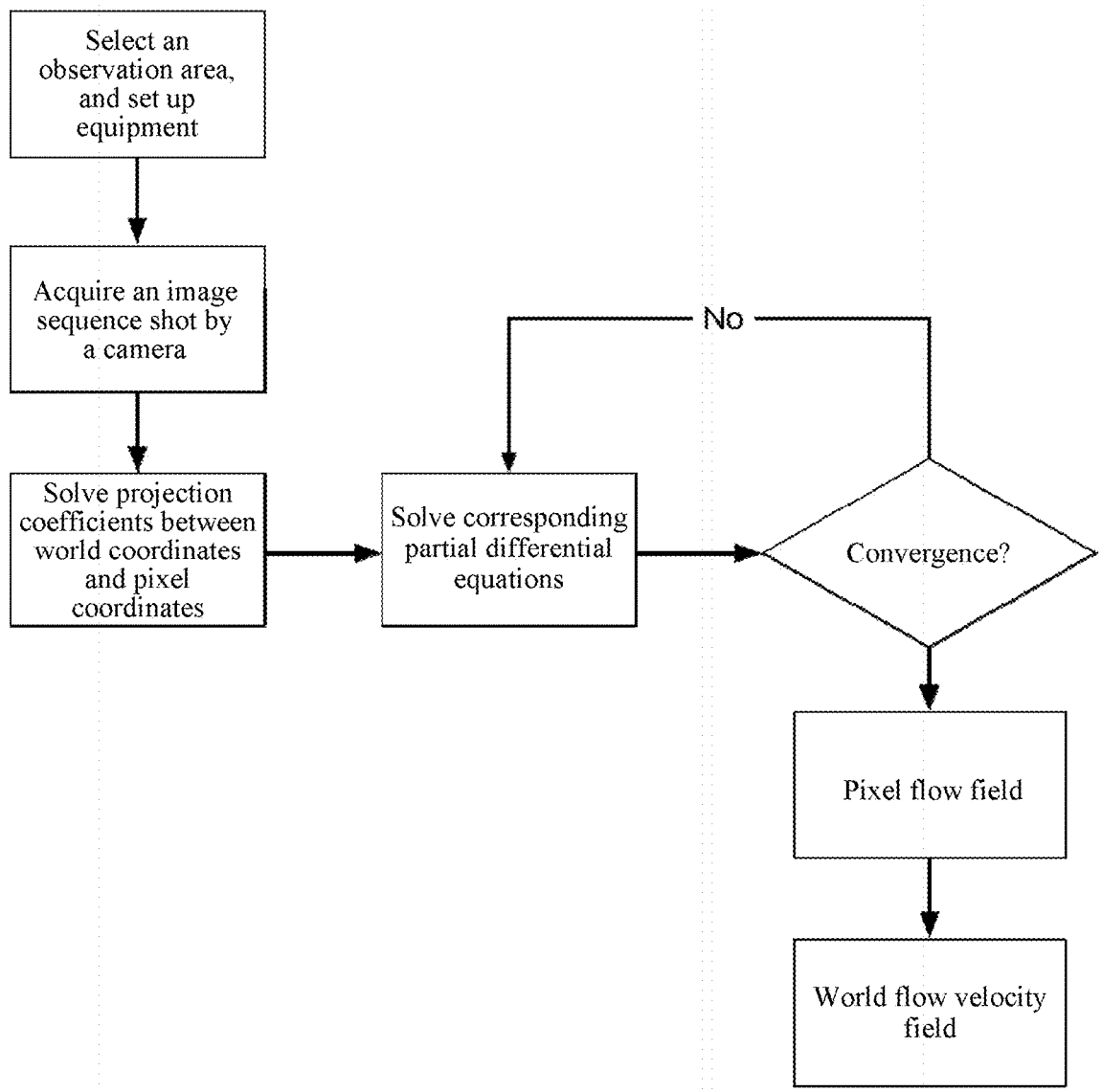
FIG. 1 is a flow chart of a method for calculating a river surface flow velocity based on a variational principle according to the present disclosure.

As shown in FIG. 1, the method for calculating the river surface flow velocity based on the variational principle provided by this embodiment may be divided into three parts: early-stage preparation for calibration before initial flow measurement, river video capture, and river surface flow velocity calculation. The method specifically includes the following steps:

Step 1: Preparation Before Initial Flow Measurement.

1.1) Early-stage preparation before initial flow measurement. First, a flow measurement site is investigated such that a selected position has a sufficient field of view to observe 80% or more of an area of the river and avoids environments that may easily damage the equipment. A power supply and transmission infrastructure required for video recording and video transmission is configured. The infrastructure includes high-definition cameras, power supplies, fixed carriers, etc.; bridging equipment for transmitting data; and remote PC equipment, and destination boards and measuring instruments for calibration. Before the flow measurement, the measuring instruments such as a total station are used to carry out related calibration and positioning processing.

1.2) Not less than 6 calibration boards are set up on left bank and right bank slopes of a river according to characteristics of a site environment. The calibration boards are designed with high-contrast signs. After the calibration boards are placed properly, coordinates of the calibration boards are measured and recorded using a measuring equipment such as a total station.

1.3) River video capture. After a camera is mounted on a fixed platform for shooting, a shooting angle and a focal length are adjusted such that a field of view is capable of covering the calibration boards within a range and a motion of a fluid in the river. The river is filmed by the camera, the video is transmitted to a PC terminal through the bridging equipment for preliminary review, and the video is checked for a number of frames and damaged frames. A satisfactory video sequence is transferred to a preprocessing stage, and an unsatisfactory video sequence is deleted.

1.4) On-site calibration is carried out. A transformation matrix and a relationship between world coordinates and pixel coordinates are obtained.

Figure 2:
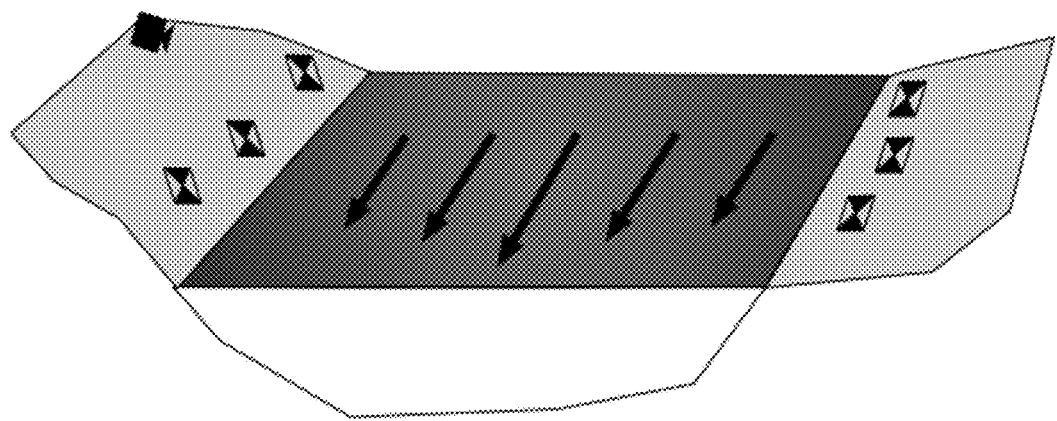
FIG. 2 is a schematic diagram of camera calibration according to the present disclosure.

In order to determine the relationship between the pixel point coordinates and the three-dimensional coordinates, internal and external parameters of a camera model are determined, and a DLT linear transformation method is introduced. The at least 6 calibration boards are set up on site. The calibration boards should be clearly visible in the field of view, as shown in FIG. 2. Coordinates of the pixel point in the image are marked as (i,j), where i represents a set of pixels in an i-th row in the image, and j represents a set of pixels in a j-th column in the image. The coordinates of a corresponding point in a three-dimensional space are marked as (x,y,z), and an n-th undetermined parameter of a camera calibration is marked as $l_n$. A calculation is carried out according to the following transformation formula:

$$i = \frac{l_1 x + l_2 y + l_3 z_w + l_4}{l_9 x + l_{10} y + l_{11} z_w + 1}, j = \frac{l_5 x + l_6 y + l_7 z_w + l_8}{l_9 x + l_{10} y + l_{11} z_w + 1}.$$

For convenience of introduction, mapping of pixel coordinates projected to the world coordinates is represented by $$Proj\left(\begin{bmatrix} i \\ j \end{bmatrix}\right) \rightarrow \begin{bmatrix} x \\ y \\ z \end{bmatrix}.$$

Mapping of the world coordinates projected to the pixel coordinates is represented by $$Proj^{-1}\left(\begin{bmatrix} x \\ y \\ z \end{bmatrix}\right) \rightarrow \begin{bmatrix} i \\ j \end{bmatrix}.$$

The above equation is solved based on the preset at least 6 calibration points to complete the transformation from the three-dimensional coordinates of the image sequence to the coordinates of the pixel point of the image.

Step 2: A video of the river is captured by the image acquisition device, and a motion estimation of a pixel flow field of the fluid in the captured image sequence is converted into solving the following energy functional extreme value problem:

$$E(\omega(i, j)) = \int \Phi\left(\frac{\partial I}{\partial t} + \nabla I^T \omega - D\Delta I\right) + \phi(\nabla \omega) d\omega,$$

where i represents a set of pixels in an i-th row in the image, j represents a set of pixels in a j-th column in the image, t is a shooting time of the image, ω(i,j) represents a pixel flow field distribution to be solved, I=I(i,j,t) represents the captured image sequence, and D is a diffusion coefficient. ∇ is a gradient operator, Δ is a Laplacian operator, and α is a weight coefficient. ϕ and φ are functions respectively for a flow field and a gradient, which may be square functions, Huber functions and the like. The following is an introduction in a case where ϕ and φ are the $L_2$ norm, and other similar loss function combinations are similar. At this time, the form of the objective functional is:

$$E(\omega(i, j)) = \int \left(\frac{\partial I}{\partial t} + \nabla I^T \omega - D\Delta I\right)^2 + \alpha \nabla \omega^T \nabla \omega d\omega.$$

A Euler-Lagrange equation corresponding to a flow velocity field is:

$$\nabla I\left(\frac{\partial I}{\partial t} + \nabla I^T \omega - D\Delta I\right) - \alpha \Delta \omega = 0.$$

Taking the numerical value of the gradient descent as an example, the energy functional extreme value problem is solved to obtain the pixel flow field distribution ω(i,j). For an image I, a coordinate in a horizontal direction is represented by u, and a coordinate in a vertical downward direction is represented by v. For numerical discretization, taking finite difference as an example, discretization schemes of the gradient of I are:

$$\left(\frac{\partial I}{\partial u}\right)_{i,j} = \begin{cases} I_{i,j+1} - I_{i,j}, & j < w \\ 0, & j = w \end{cases};$$

$$\left(\frac{\partial I}{\partial v}\right)_{i,j} = \begin{cases} I_{i+1,j} - I_{i,j}, & i < h \\ 0, & i = h \end{cases}.$$

Figure 3:
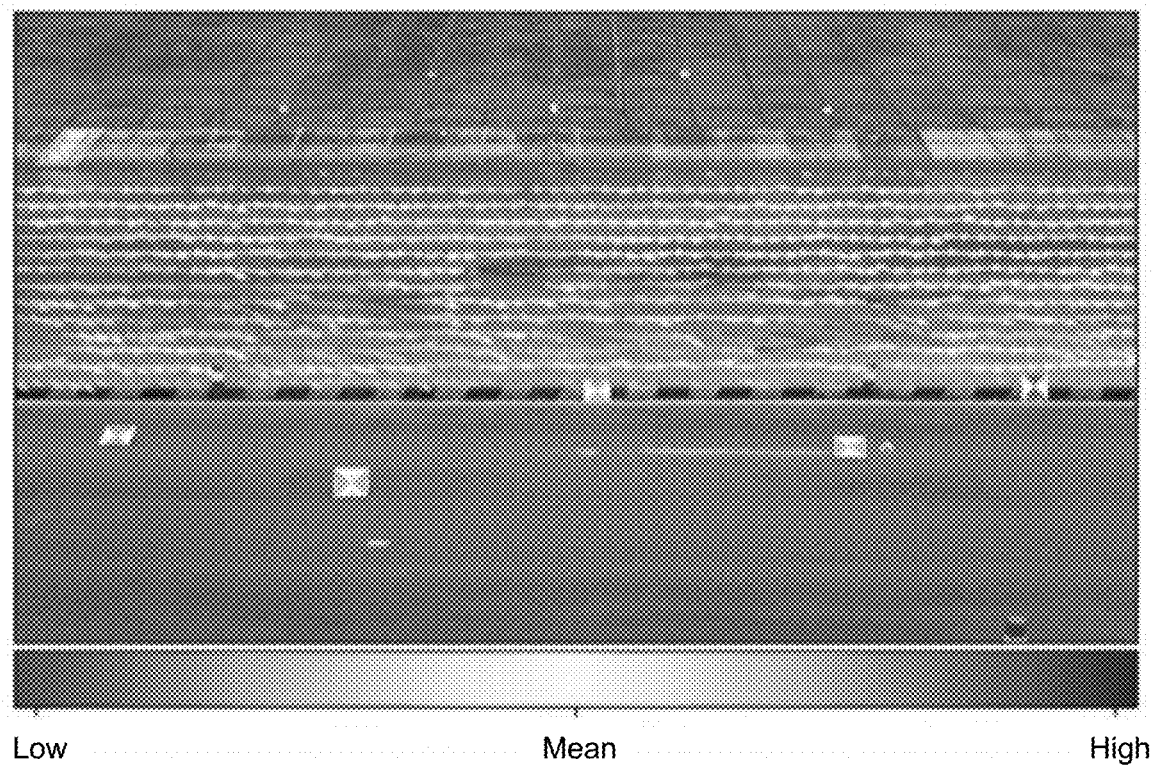
FIG. 3 is a schematic diagram of a pixel flow field according to the present disclosure.

The equations are iteratively solved through the following iterative scheme until convergence, where θ is a step parameter. The obtained pixel flow field result is shown in FIG. 3. The motion direction and velocity of the pixel point of the river are inverted.

$$\omega^{k+1} = \omega^k - \theta \left\{ \nabla I^k \left( \frac{\partial I^k}{\partial t} + \nabla (I^k)^T \omega^k - D\Delta I^k \right) - \alpha \Delta \omega^k \right\},$$

where θ is the step parameter, w represents a width of the image, h represents a height of the image, and k represents a count of the current round of iteration.

Step 3: Flow velocity calculation.

After the flow velocity field of the pixel in the step 2 is obtained, projective transformation is carried out in conjunction with the projection relationship between the world coordinate system and the pixel coordinate system in the step 1.4, that is, $$\text{Proj}\left( \begin{bmatrix} i \\ j \end{bmatrix} \right) \to \begin{bmatrix} x \\ y \\ z \end{bmatrix} \text{ and } \text{Proj}\left( \begin{bmatrix} i \\ j \end{bmatrix} \right) \to \begin{bmatrix} x \\ y \\ z \end{bmatrix}.$$

Space coordinates of the pixel point in a world coordinate system are obtained, and the flow velocity $$v = \frac{d}{\Delta t}$$

may be further obtained, where v is the flow velocity in m/s. d is the length of the flow velocity vector in ω projected to the world coordinates in m. Δt is a time difference between frames of the calculated images in s.

Further, this embodiment further provides a device for calculating a river surface flow velocity capable of automatically implementing the above method. The device includes a transformation relationship acquisition part, a solving part, a flow velocity calculation part, an input and display part and a control part.

The transformation relationship acquisition part is configured to acquire and record coordinates of calibration boards by an image acquisition device whose field of view is capable of covering the calibration boards (calibration points) within a range and a motion of a fluid in the river, and then determine a transformation relationship from three-dimensional coordinates of the image sequence to coordinates of the pixel point of the image based on positions of the calibration boards.

Specifically, coordinates of the pixel point in the image are marked as (i,j), where i represents a set of pixels in an i-th row in the image, and j represents a set of pixels in a j-th column in the image. The coordinates of a corresponding point in the three-dimensional space are marked as (x,y,z), and an n-th undetermined parameter of camera calibration is marked as $l_n$. Calculation is carried out according to the following transformation formula:

$$i = \frac{l_1 x + l_2 y + l_3 z_w + l_4}{l_9 x + l_{10} y + l_{11} z_w + 1}, j = \frac{l_5 x + l_6 y + l_7 z_w + l_8}{l_9 x + l_{10} y + l_{11} z_w + 1}.$$

Mapping of pixel coordinates projected to the world coordinates is represented by $$\text{Proj}\left( \begin{bmatrix} i \\ j \end{bmatrix} \right) \to \begin{bmatrix} x \\ y \\ z \end{bmatrix},$$

and mapping of the world coordinates projected to the pixel coordinates is represented by $$\text{Proj}^{-1}\left( \begin{bmatrix} x \\ y \\ z \end{bmatrix} \right) \to \begin{bmatrix} i \\ j \end{bmatrix}.$$

The above equation is solved based on the preset at least 6 calibration points to complete the transformation from the three-dimensional coordinates of the image sequence to the coordinates of the pixel point of the image.

The solving part is configured to capture a video of the river by the image acquisition device, and convert a motion of a pixel flow field of the fluid in the captured image sequence into solving the following energy functional extreme value problem.

$$E(\omega(i, j)) = \int \Phi\left( \frac{\partial I}{\partial t} + \nabla I^T \omega - D\Delta I \right) + \phi(\nabla \omega) d\omega$$

where ω(i,j) represents a pixel flow field distribution to be solved, I=I(i,j,t) represents the captured image sequence, and D is a diffusion coefficient. ∇ is a gradient operator, Δ is a Laplacian operator, and α is a weight coefficient. Φ and φ are functions respectively for the flow field and a gradient. The general form of the objective functional is:

$$E(\omega(i, j)) = \int \left( \frac{\partial I}{\partial t} + \nabla I^T \omega - D\Delta I \right)^2 + \alpha \nabla \omega^T \nabla \omega d\omega.$$

The pixel flow field distribution ω(i,j) is solved. Specifically, a Euler-Lagrange equation corresponding to a flow velocity field is:

$$\nabla I \left( \frac{\partial I}{\partial t} + \nabla I^T \omega - D\Delta I \right) - \alpha \Delta \omega = 0.$$

For an image I, a coordinate in a horizontal direction is represented by u, and a coordinate in a vertical downward direction is represented by v, and for numerical discretization, discretization schemes of the gradient of I are:

$$\left( \frac{\partial I}{\partial u} \right)_{i,j} = \begin{cases} I_{i,j+1} - I_{i,j}, & j < w \\ 0, & j = w \end{cases}$$

$$\left( \frac{\partial I}{\partial v} \right)_{i,j} = \begin{cases} I_{i+j,1} - I_{i,j}, & i < h \\ 0, & i = h \end{cases}$$

where w represents a width of the image, and h represents a height of the image.

The equations are iteratively solved through the following formula until convergence, and the motion direction and velocity of the pixel point of the river are inverted:

$$\omega^{k+1} = \omega^k - \theta \left\{ \nabla I^k \left( \frac{\partial I^k}{\partial t} + \nabla (I^k)^T \omega^k - D\Delta I^k \right) - \alpha \Delta \omega^k \right\}$$

where θ is a step, and k represents a count of the current round of iteration.

The flow velocity calculation part is configured to obtain space coordinates of the pixel point in a world coordinate system according to the solving result of the solving part and the transformation relationship determined by the transformation relationship acquisition part, and further obtain the flow velocity $$v = \frac{d}{\Delta t},$$

where d is a length of a flow velocity vector in w projected to the world coordinates, and $\Delta t$ is a time difference between frames of the calculated images.

The input and display part communicates with the transformation relationship acquisition part, the solving part, the flow velocity calculation part and the control part, and is configured to allow a user to input an operation instruction and display a corresponding result.

The control part communicates with the transformation relationship acquisition part, the solving part, the flow velocity calculation part, and the input and display part, and is configured to control operations thereof.

The above embodiment is merely an example to illustrate the technical solution of the present disclosure. The method and device for calculating a river surface flow velocity based on a variational principle according to the present disclosure are not limited to the content described in the above embodiment, but are subject to the scope defined in the claims. Any modifications, additions or equivalent substitutions made by those skilled in the art of the present disclosure on the basis of this embodiment are within the protection scope of the claims of the present disclosure.

What is claimed is:

1. A method for calculating a river surface flow velocity based on a variational principle, comprising the following steps:

step 1: preparation before initial flow measurement:
setting up a plurality of calibration boards on left bank and right bank slopes of a river according to characteristics of a site environment, and measuring and recording coordinates of the plurality of calibration boards using a measuring equipment;
setting up an image acquisition device, and adjusting a shooting angle and a focal length such that a field of view is capable of covering the plurality of calibration boards within a range and a motion of a fluid in the river;
determining a transformation relationship from three-dimensional coordinates of an image sequence to coordinates of a pixel point of an image based on positions of the plurality of calibration boards;
step 2: capturing a video of the river by the image acquisition device, and converting a motion of a pixel flow field of the fluid in a captured image sequence into solving the following energy functional extreme value problem;

$$E(\omega(i, j)) = \int \Phi\left(\frac{\partial I}{\partial t} + \nabla I^T \omega - D\Delta I\right) + \phi(\nabla \omega) d\omega \quad (1)$$

wherein i represents a set of pixels in an i-th row in the image, j represents a set of pixels in a j-th column in the image, t is a shooting time of the image, $\omega(i,j)$ represents a pixel flow field distribution to be solved, I=I(i, j,t) represents the captured image sequence, and D is a diffusion coefficient; $\nabla$ is a gradient operator, $\Delta$ is a Laplacian operator, and $\alpha$ is a weight coefficient; $\Phi$, $\phi$ are functions respectively for a flow field and a gradient; a general form of an objective functional is:

$$E(\omega(i, j)) = \int \left(\frac{\partial I}{\partial t} + \nabla I^T \omega - D\Delta I\right)^2 + \alpha \nabla \omega^T \nabla \omega d\omega \quad (2)$$

the pixel flow field distribution $\omega(i,j)$ is solved; and
step 3: obtaining space coordinates of the pixel point in a world coordinate system according to data of the pixel flow field distribution $\omega(i,j)$ calculated in the step 2 and the transformation relationship determined in the step 1, and further obtaining a flow velocity $$v = \frac{d}{\Delta t},$$

wherein d is a length of a flow velocity vector in $\omega$ projected to world coordinates, and $\Delta t$ is a time difference between frames of calculated images;
wherein the flow velocity is used for measuring a river flow and hydrometry.

2. The method for calculating the river surface flow velocity based on the variational principle according to claim 1, wherein:
in the step 1, first, a flow measurement site is investigated such that a selected position has a sufficient field of view to observe 80% or more of an area of the river; and a power supply infrastructure required for video recording and video transmission is configured.

3. The method for calculating the river surface flow velocity based on the variational principle according to claim 1, wherein:
in the step 1, the coordinates of the pixel point in the image are marked as (i,j), the coordinates of a corresponding point in a three-dimensional space are marked as (x,y,z), and an n-th undetermined parameter of a camera calibration is marked as $l_n$; a calculation is carried out according to the following transformation formula:

$$i = \frac{l_1 x + l_2 y + l_3 z_w + l_4}{l_9 x + l_{10} y + l_{11} z_w + 1}, \quad j = \frac{l_5 x + l_6 y + l_7 z_w + l_8}{l_9 x + l_{10} y + l_{11} z_w + 1} \quad (3)$$

mapping of pixel coordinates projected to the world coordinates is represented by $$\text{Proj}\left(\begin{bmatrix} i \\ j \end{bmatrix}\right) \to \begin{bmatrix} x \\ y \\ z \end{bmatrix},$$

mapping of the world coordinates projected to the pixel coordinates is represented by $$\text{Proj}^{-1}\left(\begin{bmatrix} x \\ y \\ z \end{bmatrix}\right) \to \begin{bmatrix} i \\ j \end{bmatrix},$$

and the above equation is solved based on position coordinates corresponding to the plurality of calibration boards, which are preset, to obtain the transformation relationship from the three-dimensional coordinates of the image sequence to the coordinates of the pixel point of the image.

4. The method for calculating the river surface flow velocity based on the variational principle according to claim 1, wherein:
in the step 1, a number of the plurality of calibration boards is not less than 6.

5. The method for calculating the river surface flow velocity based on the variational principle according to claim 1, wherein:
in the step 1, the river is filmed by a camera, the video is transmitted to a PC terminal through bridging equipment for preliminary review, the video is checked for a number of frames and damaged frames, a satisfactory video sequence is transferred to a preprocessing stage, and an unsatisfactory video sequence is deleted.

6. The method for calculating the river surface flow velocity based on the variational principle according to claim 1, wherein:
in the step 2, a Euler-Lagrange equation corresponding to a flow velocity field is:

$$\nabla I\left(\frac{\partial I}{\partial t} + \nabla I^T \omega - D\Delta I\right) - \alpha \Delta \omega = 0 \qquad (4)$$

for an image I, a coordinate in a horizontal direction is represented by u, and a coordinate in a vertical downward direction is represented by v, and for a numerical discretization, discretization schemes of the gradient of the I are:

$$\left(\frac{\partial I}{\partial u}\right)_{i,j} = \begin{cases} I_{i,j+1} - I_{i,j} &, j < w \\ 0 &, j = w \end{cases} \qquad (5)$$

$$\left(\frac{\partial I}{\partial v}\right)_{i,j} = \begin{cases} I_{i+1,j} - I_{i,j} &, i < h \\ 0 &, i = h \end{cases} \qquad (6)$$

wherein w represents a width of the image, and h represents a height of the image; and
a set of partial differential equations shown in formula (4) is iteratively solved through formula (7) until convergence, and a motion direction and a velocity of the pixel point of the river are inverted:

$$\omega^{k+1} = \omega^k - \theta\left\{\nabla I^k\left(\frac{\partial I^k}{\partial t} + \nabla(I^k)^T \omega^k - D\Delta I^k\right) - \alpha\Delta\omega^k\right\} \qquad (7)$$

wherein θ is a step parameter, and k represents a count of a current round of an iteration.

7. A device for calculating a river surface flow velocity based on a variational principle, the device is configured:
to acquire and record coordinates of calibration boards by an image acquisition device whose field of view is capable of covering the calibration boards within a range and a motion of a fluid in a river, and then determine a transformation relationship from three-dimensional coordinates of an image sequence to coordinates of a pixel point of an image based on positions of the calibration boards;
to capture a video of the river by the image acquisition device, and convert a motion of a pixel flow field of the fluid in a captured image sequence into solving the following energy functional extreme value problem;

$$E(\omega(i,j)) = \int \Phi\left(\frac{\partial I}{\partial t} + \nabla I^T \omega - D\Delta I\right) + \phi(\nabla \omega) d\omega \qquad (1)$$

wherein i represents a set of pixels in an i-th row in the image, j represents a set of pixels in a j-th column in the image, t is a shooting time of the image, ω(i,j) represents a pixel flow field distribution to be solved, I=I(i, j,t) represents the captured image sequence, and D is a diffusion coefficient; ∇ is a gradient operator, Δ is a Laplacian operator, and α is a weight coefficient; φ and ϕ are functions respectively for a flow field and a gradient; a general form of the objective functional is:

$$E(\omega(i,j)) = \int \left(\frac{\partial I}{\partial t} + \nabla I^T \omega - D\Delta I\right)^2 + \alpha \nabla \omega^T \nabla \omega d\omega \qquad (2)$$

the pixel flow field distribution w(i,j) is solved; and
to obtain space coordinates of the pixel point in a world coordinate system according to a solving result of the solving part and the transformation relationship determined by the device, and further obtain a flow velocity $$v = \frac{d}{\Delta t},$$

wherein d is a length of a flow velocity vector in ω projected to world coordinates, and Δt is a time difference between frames of calculated images;
wherein the flow velocity is used for measuring a river flow and hydrometry.

8. The device for calculating the river surface flow velocity based on the variational principle according to claim 7, wherein:
the coordinates of the pixel point in the image are marked as (i,j); the coordinates of a corresponding point in a three-dimensional space are marked as (x,y,z), and an n-th undetermined parameter of a camera calibration is marked as $l_n$; a calculation is carried out according to the following transformation formula:

$$i = \frac{l_1 x + l_2 y + l_3 z_w + l_4}{l_9 x + l_{10} y + l_{11} z_w + 1}, \quad j = \frac{l_5 x + l_6 y + l_7 z_w + l_8}{l_9 x + l_{10} y + l_{11} z_w + 1} \qquad (3)$$

mapping of pixel coordinates projected to the world coordinates is represented by $$\text{Proj}\left(\begin{bmatrix} i \\ j \end{bmatrix}\right) \to \begin{bmatrix} x \\ y \\ z \end{bmatrix},$$

mapping of the world coordinates projected to the pixel coordinates is represented by $$\text{Proj}^{-1}\left(\begin{bmatrix} x \\ y \\ z \end{bmatrix}\right) \rightarrow \begin{bmatrix} i \\ j \end{bmatrix},$$

and the above equation is solved based on position coordinates corresponding to the calibration boards, which are preset to obtain the transformation relationship from the three-dimensional coordinates of the image sequence to the coordinates of the pixel point of the image.

9. The device for calculating the river surface flow velocity based on the variational principle according to claim 7, wherein:

a Euler-Lagrange equation corresponding to a flow velocity field is:

$$\nabla I\left(\frac{\partial I}{\partial t} + \nabla I^T \omega\right) - D\Delta I\right) - \alpha\Delta\omega\right) = 0 \quad (4)$$

for an image I, a coordinate in a horizontal direction is represented by u, and a coordinate in a vertical downward direction is represented by v, and for numerical discretization, discretization schemes of the gradient of the I are:

$$\left(\frac{\partial I}{\partial u}\right)_{i,j} = \begin{cases} I_{i,j+1} - I_{i,j} &, j < w \\ 0 &, j = w \end{cases} \quad (5)$$

$$\left(\frac{\partial I}{\partial v}\right)_{i,j} = \begin{cases} I_{i+1,j} - I_{i,j} &, i < h \\ 0 &, i = h \end{cases} \quad (6)$$

wherein w represents a width of the image, and h represents a height of the image; and a set of partial differential equations shown in formula (4) is iteratively solved through formula (7) until convergence, and a motion direction and a velocity of the pixel point of the river are inverted:

$$\omega^{k+1} = \omega^k - \theta\left\{\nabla I^k\left(\frac{\partial I^k}{\partial t} + \nabla(I^k)^T\omega^k - D\Delta I^k\right) - \alpha\Delta\omega^k\right\} \quad (7)$$

wherein $\theta$ is a step parameter, and k represents a count of a current round of an iteration.

10. The device for calculating the river surface flow velocity based on the variational principle according to claim 7, the device is further configured:

to allow a user to input an operation instruction and display the solving result.

* * * * *